(12) United States Patent
Toews

(10) Patent No.: US 7,080,494 B2
(45) Date of Patent: Jul. 25, 2006

(54) METHOD FOR MAKING A LARGE SQUARE BALE OUT OF A PLURALITY OF SMALL BALES

(76) Inventor: Jim Toews, Box 53, Waskatenau, Alberta (CA) T0A 3P0

( * ) Notice: Subject to any disclaimer, the term of this patent is extended or adjusted under 35 U.S.C. 154(b) by 33 days.

(21) Appl. No.: 11/015,229

(22) Filed: Dec. 17, 2004

(65) Prior Publication Data

US 2006/0064942 A1   Mar. 30, 2006

(30) Foreign Application Priority Data

Sep. 24, 2004   (CA) .................................... 2480520

(51) Int. Cl.
B65B 27/12 (2006.01)
B65B 35/50 (2006.01)
A01D 90/08 (2006.01)

(52) U.S. Cl. .............................. 53/399; 53/438; 53/447; 53/529; 53/540; 53/586; 100/3; 100/7; 414/789.2; 414/790.3

(58) Field of Classification Search ................. 53/399, 53/436, 438, 439, 443, 447, 528–531, 535, 53/537, 540, 541, 152, 153, 586, 589; 100/2, 100/3, 7; 414/789.2, 111, 789.3, 789.4, 790.3, 414/792.6, 789.7; A01D 90/08
See application file for complete search history.

(56) References Cited

U.S. PATENT DOCUMENTS

| 3,289,859 | A | * | 12/1966 | Tarbox ..................... 414/789.4 |
| 3,430,783 | A | * | 3/1969 | Lee .......................... 414/789.3 |
| 3,550,349 | A | * | 12/1970 | Breen et al. ................... 53/529 |
| 3,563,162 | A | * | 2/1971 | Monroe .......................... 100/7 |
| 3,570,209 | A | * | 3/1971 | Salwasser ..................... 53/447 |
| 3,610,441 | A | * | 10/1971 | Grey et al. ............... 414/789.3 |
| 3,619,976 | A | * | 11/1971 | Kerker ......................... 53/528 |
| 3,726,210 | A | | 4/1973 | Hawkins |
| 3,926,319 | A | * | 12/1975 | Neely, Jr. ................. 414/789.7 |
| 3,938,432 | A | | 2/1976 | Jones |
| 4,178,122 | A | * | 12/1979 | Abrahamson ............ 414/789.2 |
| 4,206,698 | A | | 6/1980 | Nicholson |
| 4,370,796 | A | * | 2/1983 | Wilson ..................... 414/789.2 |
| 4,829,756 | A | | 5/1989 | Schrag et al. |

(Continued)

FOREIGN PATENT DOCUMENTS

GB       2053081 A  *  2/1981

OTHER PUBLICATIONS

Arcusin, 'Multi-pack A14—Automatic, continuos & vertical bale packing machine brochure', La Fuliola, Spain, available at www.arcusin.com, as early as Apr. 2003.

Primary Examiner—Stephen F. Gerrity
(74) Attorney, Agent, or Firm—Christensen O'Connor; Johnson Kindness PLLC

(57) ABSTRACT

A method for making a large square bale out of a plurality of small bales, utilizing a square baler. Small bales are fed into a processing chamber resting in side by side relation on a pivoting floor. The floor is pivoted from a horizontal position to a vertical position, thereby repositioning the small bales as a stack. The stack is then elevated until it is aligned with a tubular forming channel. A plunger is used to push the stack into the tubular forming channel. Once the tubular forming chamber is substantially filled with stacks of small bales, the stacks are banded to form one large square bale.

1 Claim, 5 Drawing Sheets

U.S. PATENT DOCUMENTS 4,913,618 A * 4/1990 Grey et al. .............. 414/789.7
5,822,957 A * 10/1998 Esch .......................... 53/529
6,182,563 B1 2/2001 Brown, Jr.
2001/0006023 A1 7/2001 Brown, Jr.

* cited by examiner

METHOD FOR MAKING A LARGE SQUARE BALE OUT OF A PLURALITY OF SMALL BALES

FIELD OF THE INVENTION

The present invention relates to a method for making a large square bale out of a plurality of small bales.

BACKGROUND OF THE INVENTION

There is a demand for small bales for feeding horses by hand. Small bales can be handled manually and are ideal for use, for example, in horse stables. Unfortunately, small bales have a substantial handling cost, as compared to larger bales, which are now handled entirely by mechanized equipment.

U.S. Pat. No. 6,182,563 (Brown Jr. 2001) is an example of a patent which describes a method an apparatus developed for the purpose of stacking small hay bales and forming them into a large square bale.

SUMMARY OF THE INVENTION

The present invention relates to an alternative method for making a large square bale out of a plurality of small bales.

According to the present invention there is provided a method for making a large square bale out of a plurality of small bales. This method utilizes a large square baler having a processing chamber with a floor divided into a first portion which pivots about a substantially horizontal pivot axis and a second portion which is capable of being raised and lowered; and a plunger which moves reciprocally in and out of a tubular forming channel. A first step involves feeding small bales into the processing chamber. A second step involves positioning at least two small bales in side by side relation on the first portion of the floor of the processing chamber. A third step involves pivoting the first portion of the floor from a substantially horizontal position to a substantially vertical position, thereby repositioning the at least two small bales as a stack of small bales. A fourth step involves elevating the second portion of the floor until the stack of small bales is aligned with the tubular forming channel and positioned in the path of a plunger. A fifth step involves pushing the stack of small bales with the plunger into the tubular forming channel. The first through fifth steps are repeated until the tubular forming chamber is substantially filled with stacks of small bales. A sixth step involves banding the stacks of small bales to form one large square bale. A seventh step involves ejecting the large square bale from a remote end of the tubular forming channel.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred method for making a large square bale out of a plurality of small bales will now be described with reference to FIGS. 1 through 7.

Figure 6:
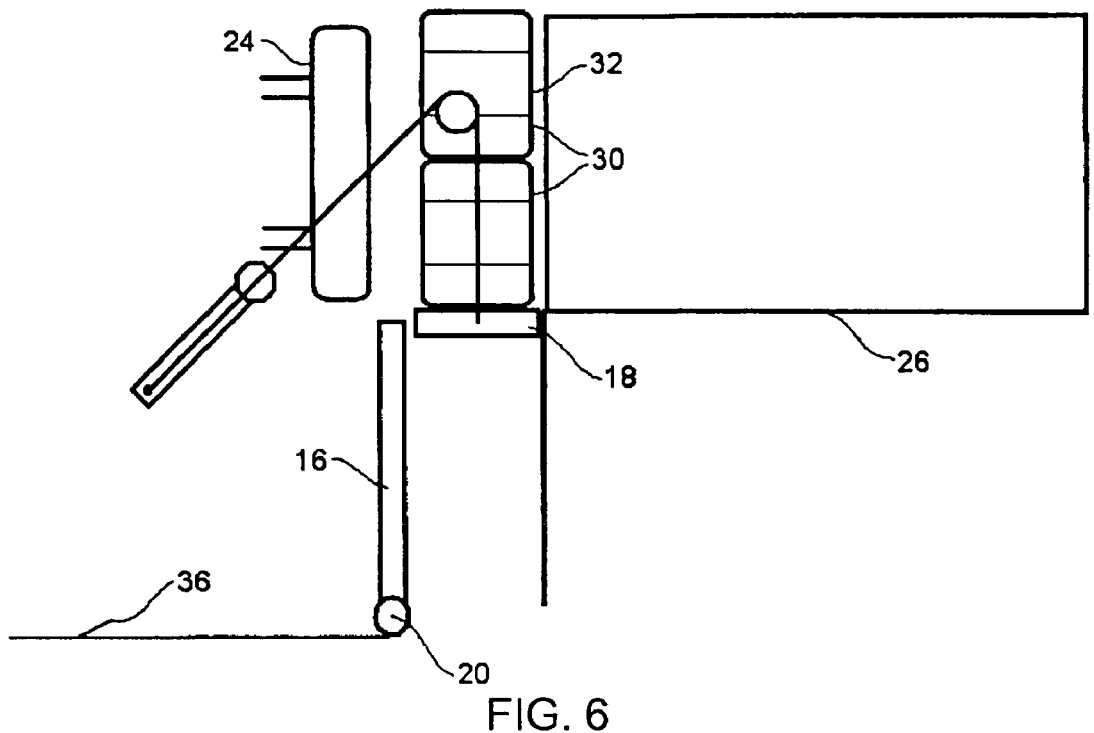
FIG. 6 is a side elevation view, in section, of the apparatus illustrated in FIG. 5, showing the second portion of the floor being elevated to align the stack with a tubular forming channel.
Figure 7:
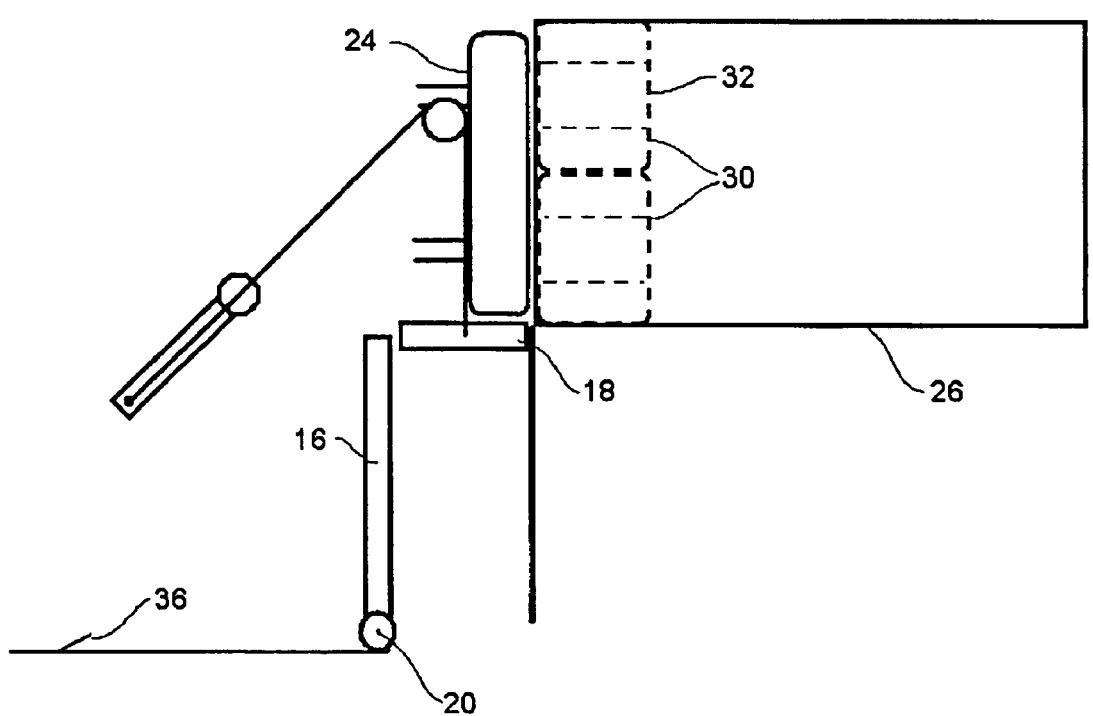
FIG. 7 is a side elevation view, in section, of the apparatus illustrated in FIG. 6, showing the stack being pushed by a plunger into the tubular forming channel.

Structure and Relationship of Parts:

There are a number of apparatus for forming large square bales that are commercially available, which have a similar basic structure. These apparatus can, with suitable modifications, be adapted to switch from baling loose crop material to baling small bales, as will hereinafter be further described. The basic requirements are that the apparatus employed must have a processing chamber 12 with a floor 14 divided into a first portion 16 and a second portion 18. First portion 16 of floor 14 must be capable of pivoting about a substantially horizontal pivot axis 20, from a substantially horizontal orientation illustrated in FIG. 4 to a substantially vertical orientation illustrated in FIG. 5. A movable pressure member 22 must be provided to reposition bales on first portion 16 of floor 14. Second portion 18 of floor 14 must be capable of being raised and timed to the plunger, and lowered, with the lowered position illustrated in FIG. 5 and the raised position illustrated in FIG. 6. A plunger 24 must be provided which moves reciprocally in relation to a tubular forming channel 26. Referring to FIG. 6, plunger 24 is shown in a retracted position. Referring to FIG. 7, plunger 24 is shown in an extended position. Switches 34 may be included throughout to ensure the safe operation of the apparatus. Switches 34 may be mechanical, or any other type of switch that is convenient. Switches 34 are located throughout to ensure that bales 30 are correctly positioned before the next step is taken. The switches shown are for examples, and not meant to be an exhaustive list or to shown a required switch. For example, referring to FIG. 1, two bales 30 are required on first portion 16 of floor 14 before it will pivot about pivot axis 20. One other modification which may be required is with the input 36. A movable portion 38 allows the bale to go around the corner without getting stuck or deformed as orbit motor 40 and chains move the bale along.

Figure 1:
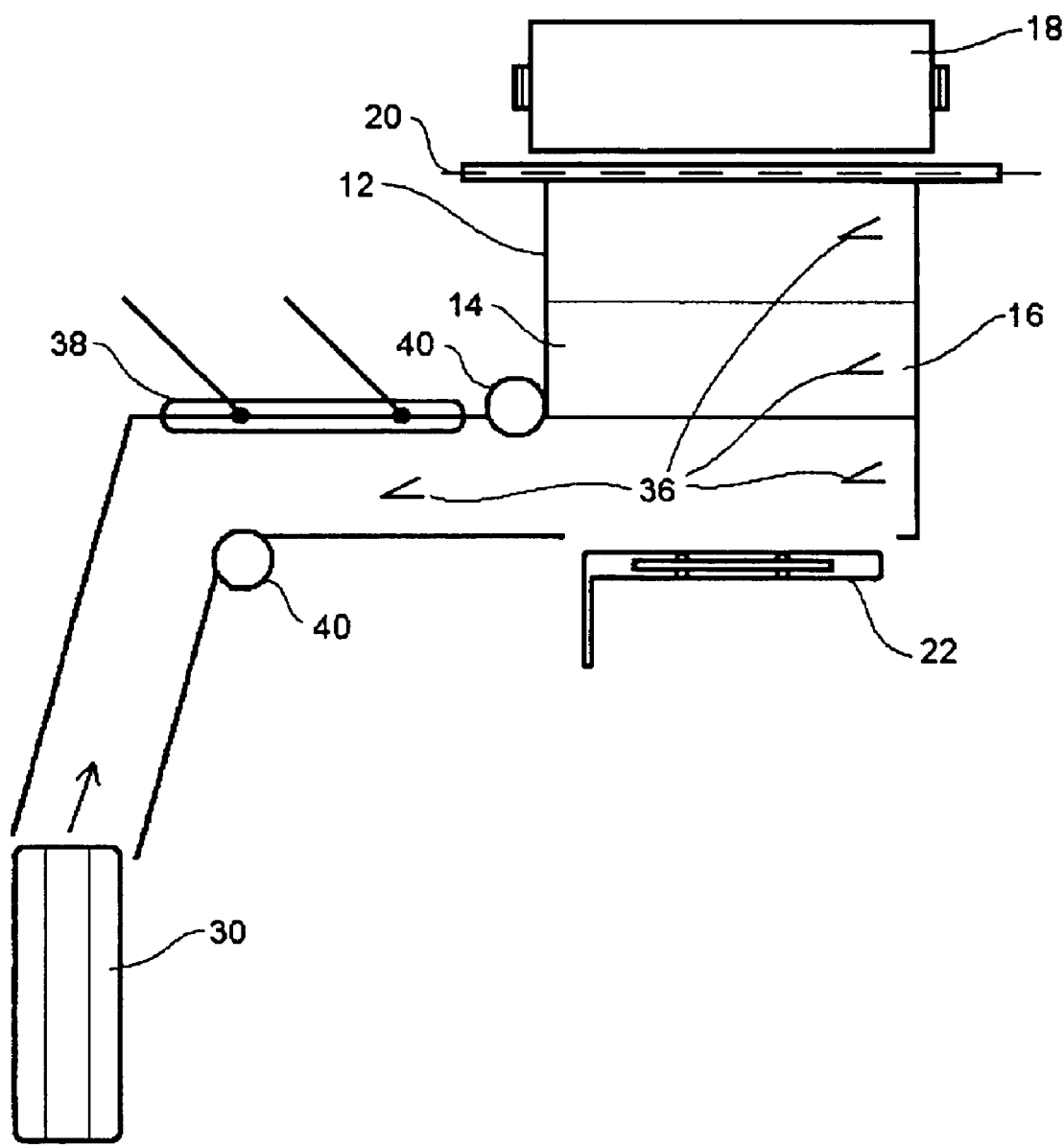
FIG. 1 is a top plan view, in section, of a modified intake for an apparatus for forming large square bales constructed in accordance with the teachings of the present method.
Figure 2:
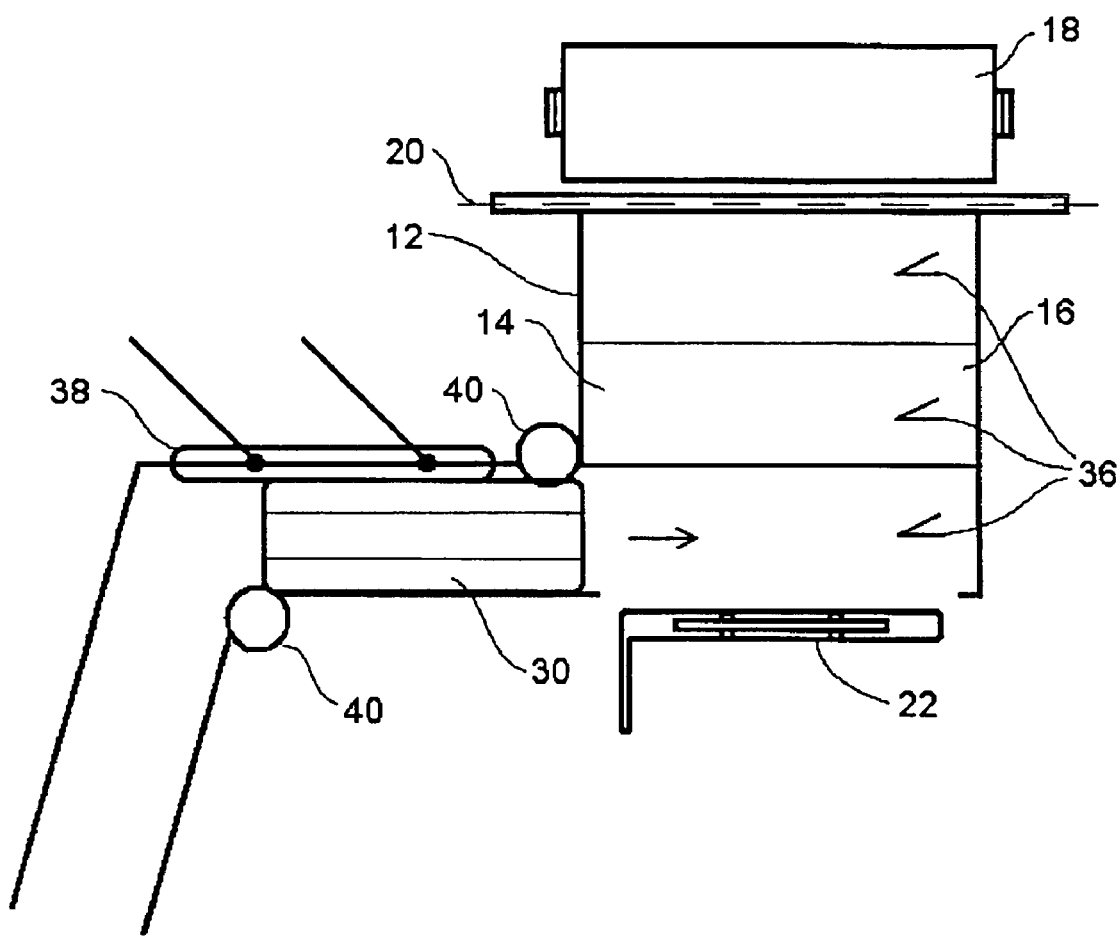
FIG. 2 is a top plan view, in section, of the intake for the apparatus illustrated in FIG. 1, showing a first small bale entering a first portion of a floor of a processing chamber.
Figure 3:
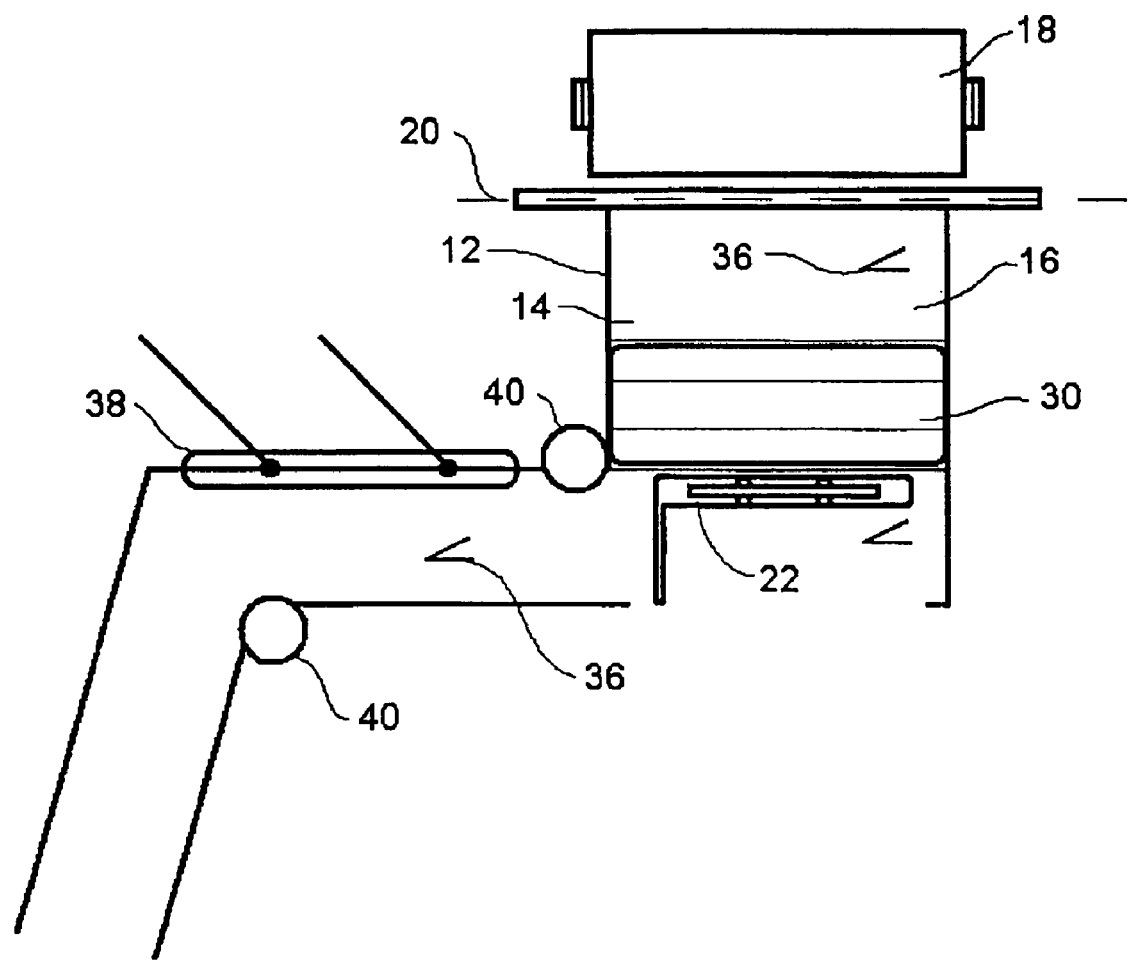
FIG. 3 is a top plan view, in section, of the intake for the apparatus illustrated in FIG. 1, showing the first small bale being repositioned on the first portion of the floor of the processing chamber.

Operation:

The method involves the following steps:

Referring to FIGS. 1 through 3, a first step involves feeding small bales 30 into processing chamber 12.

Figure 4:
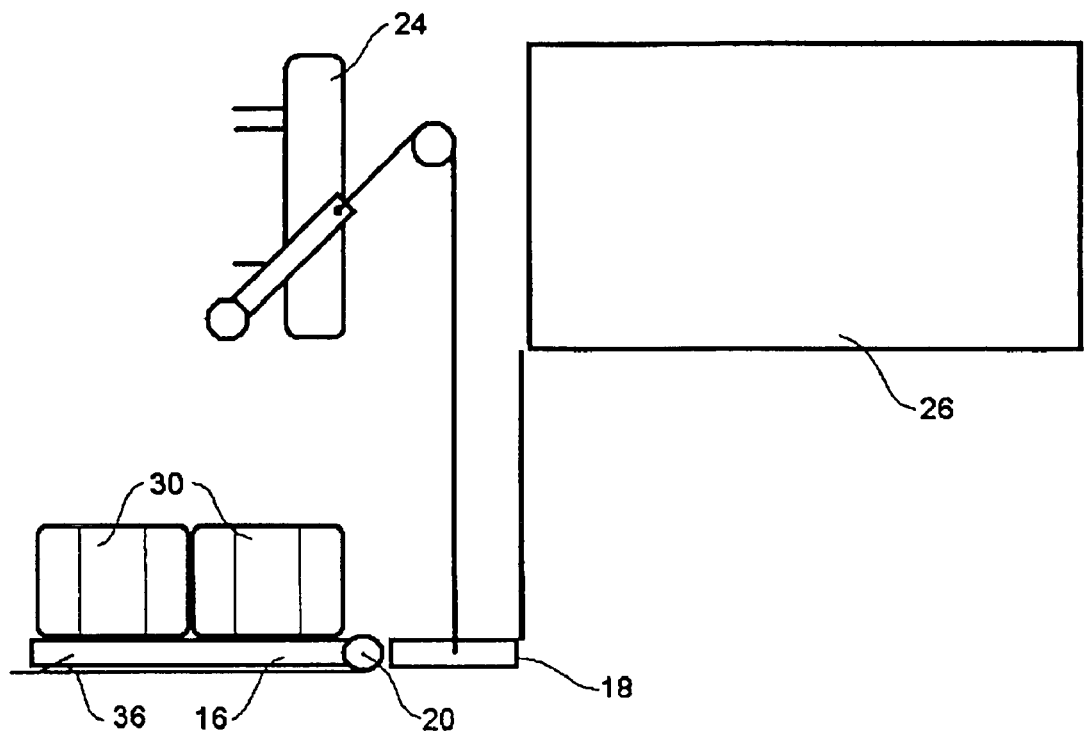
FIG. 4 is a side elevation view, in section, of the apparatus illustrated in FIG. 1, showing two small bales positioned on the first portion of the floor of the processing chamber.

Referring to FIG. 4, a second step involves positioning small bales 30 in side by side relation on first portion 16 of floor 14 of processing chamber 12.

Figure 5:
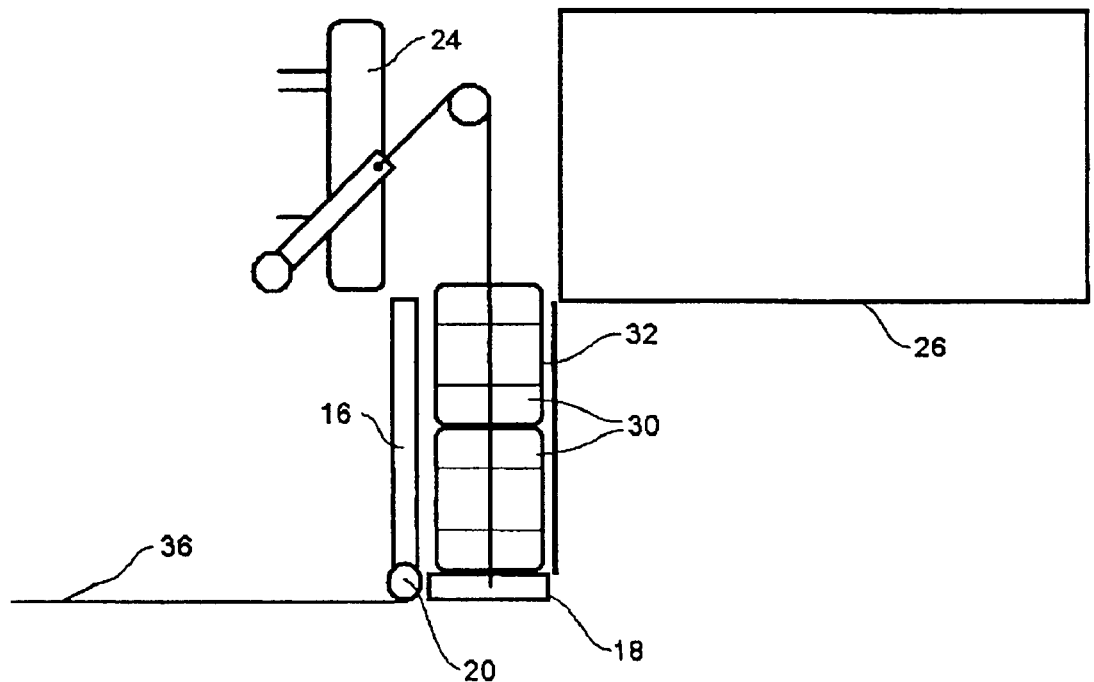
FIG. 5 is a side elevation view, in section, of the apparatus illustrated in FIG. 4, showing the first portion of the floor of the processing chamber pivoting to reposition the two small bales as a stack on the second portion of the floor of the processing chamber.

Referring to FIG. 5, a third step involves pivoting first portion 16 of floor 14 about axis 20 to move first portion 16 of floor 14 from the substantially horizontal position illustrated in FIG. 4 to a substantially vertical position, as illustrated in FIG. 5. This movement repositions small bales 30 as a stack of small bales, generally indicated by reference numeral 32, resting upon second portion 18 of floor 14.

Referring to FIG. 6, a fourth step involves elevating second portion 18 of floor 14 until stack of small bales 32 is aligned with tubular forming channel 26 and positioned in the path of plunger 24.

Referring to FIG. 7, a fifth step involves pushing stack of small bales 32 with plunger 24 into tubular forming channel 26.

It will be appreciated by one skilled in the art that the first through fifth steps are repeated until tubular forming chamber 26 is substantially filled with stacks of small bales 32. The stacks of small bales are then banded to form one large square bale, in the same manner that apparatus for forming large square bales currently function to band compacted crop material. The large square bale, so formed, can then be ejected from a remote end of tubular forming channel 26 in the usual manner.

The result is a plurality of small bales, banded to form a large square bale. The large square bale can then be transported using mechanized bale handling equipment. When the bands holding the large square bale, are subsequently severed, the consumer is left with a plurality of small bales. Another advantage to using the dimensions of a large baler is that the size of the bale comprised of smaller bales, is that the size of the bale is standard, and existing equipment can easily be used to transport it.

The above description involves banding small bales together to form large bales. While it is common in the industry to use steel bands, it is preferred that the banding be done using twine. Not only does this remove the need for another modification to the baler described, twine is also more easily cut by the user.

Cautionary Warnings:

In order to prove that the above described method would work, a large square baler manufactured by Hesston Corporation was modified. Small bales were fed into the Hesston square baler, and it was confirmed that it would not work for small bales, without major modifications to the timing of each movement. First, small bales 30 had to be fed into processing chamber 12 such that that they were in side by side relation, before the first portion 16 of floor 14 began to pivot. Switches 34 were used to ensure that this occurred before floor 14 would pivot. Then the movement of plunger 24 had to be modified to allow time for second portion 18 of floor 14 to raise sufficiently to position stack of small bales 32 in alignment with tubular forming channel 26. The modifications required plunger 24 to travel as approximately one half of its previous speed in relation to the stuffer shaft and knotter. Eventually, success was achieved in processing small bales through the Hesston large square baler, as modified.

The standard size of the small square baler is 14"×18", with the length being adjustable and the size of the modified baler's bale chamber is 34.4"×32" with the length being adjustable. To ensure that bale stack 32 would fit in the modified baler's bale chamber 26, shims were added in the small square baler chamber to produce a 14"×17" bale that was set for a length of 32". Alternatively, the larger bale chamber could be modified from 34.4" to 36" which would eliminate the need for the shims in the small square baler.

In order to ensure equal length of all large bales being produced and not having the knotter (not shown) triggered during an empty plunger stroke, the final trigger mechanism for the knotter was modified so that it would be triggered by elevator floor 18 cycle as shown in FIG. 6.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method for making a large square bale out of a plurality of small bales, utilizing a square baler having a processing chamber with a floor divided into a first portion which pivots about a substantially horizontal pivot axis and a second portion which is capable of being raised and lowered, and a plunger which moves reciprocally in and out of a tubular forming channel, the method comprising the steps of:

feeding small bales into the processing chamber;

positioning at least two small bales in side by side relation on the first portion of the floor of the processing chamber;

pivoting the first portion of the floor from a substantially horizontal position to a substantially vertical position, thereby positioning the at least two small bales as a stack of small bales;

elevating the second portion of the floor until the stack of small bales is aligned with the tubular forming channel and positioned in the path of a plunger;

pushing the stack of small bales with the plunger into the tubular forming channel;

repeating the above steps until the tubular forming chamber is substantially filled with stacks of small bales;

banding the stacks of small bales to form one large square bale; and ejecting the large square bale from a remote end of the tubular forming channel.

* * * * *